(12) United States Patent
Ishino

(10) Patent No.: US 6,982,769 B2
(45) Date of Patent: Jan. 3, 2006

(54) SUBSTRATE FOR LIQUID-CRYSTAL DISPLAY DEVICE AND FABRICATION METHOD THEREOF

(75) Inventor: Takayuki Ishino, Kagoshima (JP)

(73) Assignee: NEC LCD Technologies, Ltd., Kanagawa (JP)

(*) Notice: Subject to any disclaimer, the term of this patent is extended or adjusted under 35 U.S.C. 154(b) by 93 days.

(21) Appl. No.: 10/638,000

(22) Filed: Aug. 8, 2003

(65) Prior Publication Data

US 2004/0046912 A1 Mar. 11, 2004

(30) Foreign Application Priority Data

Aug. 9, 2002 (JP) .............................. 2002-232542

(51) Int. Cl.
*G02F 1/136* (2006.01)
(52) U.S. Cl. ........................ 349/43; 349/41; 349/42; 349/52; 349/113; 349/114
(58) Field of Classification Search ............... 349/43, 349/113, 114, 41, 42, 52
See application file for complete search history.

(56) References Cited

U.S. PATENT DOCUMENTS 5,818,550 A * 10/1998 Kadota et al. ............... 349/43

5,943,105 A * 8/1999 Fujikawa et al. ............ 349/39
6,515,428 B1 * 2/2003 Yeh et al. ................. 315/169.3

FOREIGN PATENT DOCUMENTS

| JP | 13-147446 | 5/2001 |
| KR | 1998-21818 | 6/1998 |

* cited by examiner

Primary Examiner—Dung T. Nguyen
Assistant Examiner—George Y. Wang
(74) Attorney, Agent, or Firm—Scully, Scott, Murphy & Presser

(57) ABSTRACT

A substrate for a LCD device improves the flatness of the outermost substrate surface in the contact region for interconnecting an electrode of a switching element (e.g., a TFT) and a pixel electrode to each other in each pixel. Switching elements for respective pixels are formed on a transparent plate. Protrusions for the respective pixels are formed on the plate to protrude to a vicinity of an outermost surface of the substrate. Each protrusion raises an electrode of a corresponding switching element to the vicinity of the outermost surface in the corresponding pixel. A planarization layer forming the outermost surface is formed to cover the switching elements, the protrusions, and the electrodes of the elements in all the pixels. Pixel electrodes for the respective pixels are formed on the outermost surface. Each pixel electrode contacts the corresponding electrode of the element in the vicinity of the outermost surface.

19 Claims, 8 Drawing Sheets

SUBSTRATE FOR LIQUID-CRYSTAL DISPLAY DEVICE AND FABRICATION METHOD THEREOF

BACKGROUND OF THE INVENTION

1. Field of the Invention

The present invention relates to a liquid-crystal display (LCD) device. More particularly, the invention relates to a substrate for a LCD device, a fabrication method thereof, and a LCD device using the substrate.

2. Description of the Related Art

As known well, the LCD device comprises a TFT (Thin-Film Transistor) array substrate on which TFTs are arranged at the respective intersections of gate electrodes and data electrodes formed in such a way as to form an array, an opposite substrate on which an opposite electrode or electrodes are formed, and a liquid crystal layer formed between these two substrates.

FIG. 1 shows an example of the pixel structure of a prior-art TFT array substrate 800. Although a plurality of pixels is actually arranged on the substrate, one pixel will be explained here for the sake of simplification of description.

This substrate 800 has a color filter 809 formed by an organic layer, which is a so-called a "color-filter-on (CF-on) TFT substrate". With the CF-on-TFT substrate, the color filter 809 is provided on the TFT substrate 800 and therefore, the gap between the TFT array and the color filter 809 is approximately eliminated. As a result, there is an advantage that a high-resolution LCD device is realizable by progressing the miniaturization of the respective pixels while suppressing the reduction of the aperture ratio through setting the line width of the black matrix (BM) at its minimum.

With the CF-on-TFT array substrate 800, as shown in FIG. 1, a gate electrode 802 is formed on the transparent plate 801. The gate electrode 802 is covered with an inorganic gate dielectric layer 803, formed on the plate 801. On the gate dielectric layer 803, a patterned amorphous silicon (a-Si) layer 804 is formed in such a way as to overlap with the gate electrode 802. A drain electrode 806 and a source electrode 807 are formed at the opposite ends of the a-Si layer 804, respectively. The gate electrode 802, the gate dielectric layer 803, the a-Si layer 804, and the drain and source electrodes 806 and 807 constitute a TFT 820.

The TFT 820 is covered with an inorganic interlayer dielectric layer (which serves as a passivation layer) 808. The layer 808 has a contact hole 805a that exposes partially the underlying source electrode 807. The hole 805a is rectangular in horizontal cross section.

On the interlayer dielectric layer 808, a patterned color filter (i.e., a color layer) 809 is formed. The layer 808 has a contact hole 805b that exposes partially the underlying source electrode 807. The hole 805b is rectangular in horizontal cross section and is larger than the contact hole 805a of the interlayer dielectric layer 808.

On the color filter 809, a patterned light-shielding layer 810 is selectively formed at a location that overlaps with the TFT 820. The layer 810 has a function of preventing the external light from irradiating to the a-Si layer 804 and the drain electrode 806 of the TFT 820.

Moreover, an organic transparent interlayer dielectric layer 811 is formed on the color filter 809 to cover the light-shielding layer 810. The layer 811 has a contact hole 805c at a location that overlaps with the contact holes 805a and 805b, thereby partially exposing the underlying source electrode 807. The hole 805c is rectangular in horizontal cross section. The hole 805c is larger than the hole 805a but smaller than the hole 805b.

On the interlayer dielectric layer 811, in other words, on the outermost surface 821 of the TFT array substrate 800, a pixel electrode 812 is formed. The pixel electrode 812 is extended along the inner wall of the contact hole 805c of the layer 811 and contacted with the source electrode 807 by way of the contact hole 805a of the interlayer dielectric layer 808. In this way, the pixel electrode 812 and the source electrode 807 are electrically connected to each other.

FIG. 2 shows a plan view showing the layout in the contact region 903 (i.e., in the neighborhood of the contact hole 805a) of the prior-art CF-on-TFT substrate 900 of FIG. 1.

The colored resist materials for the color filter 809 are less in chemical resistance. Therefore, if the resist materials are kept exposed during the process steps, partial loss of the filter 809 will occur through a subsequent process step or steps. Therefore, the structure of FIG. 1 is adopted in order that the organic interlayer dielectric layer 811 surely covers not only the surface of the filter 809 but also the inner wall surface of the hole 805b. In other words, as shown in FIG. 2, the boundary 909 of the color filter 809 on the side of the hole 805b and the boundary 911 of the dielectric layer 811 on the side of the hole 805c are horizontally shifted to each other (i.e., the boundary 909 is located outside the boundary 911). Thus, it is ensured that the filter 809 is covered with the layer 811. This structure may be called a "multiple contact-hole structure".

It is popular that the thickness of the organic interlayer dielectric layer 811 is 2 to 3 μm (i.e., 2000 to 3000 nm) and the thickness of the inorganic interlayer dielectric layer 808 is several hundreds nanometers (nm). The color filter 809 with approximately the same thickness as the layer 811 is located between these dielectric layers 811 and 808. Therefore, with the prior-art TFT array substrate 800, the contact hole 805c of the layer 811 will cause a large and deep step (e.g., the height difference or depth is 4 to 6 μm). As a result, a deep depression is formed for each pixel on the outermost surface 821 of the substrate 800, as shown in FIG. 1. These depressions will disturb the orientation of the liquid crystal confined in the liquid crystal layer and thus, there arises a problem that the control of transmitting light is difficult to thereby induce leak of light. This means that the display quality degrades due to contrast reduction.

To avoid the leak of light, the source electrode 807 is typically utilized. Specifically, the shape and size of the electrode 807 are determined in such a way as to completely prevent the leak of light. In this case, however, there arises another problem that the aperture ratio will lower and the luminance of the LCD panel will deteriorate.

In particular, to form the multiple contact-hole structure (i.e., the contact region 903) as shown in FIG. 1, appropriate margins need to be provided in the respective process steps of forming the contact holes 805a, 805b, and 805c. Therefore, the hole 805b located at the horizontally outermost position will be considerably large in size, in other words, the contact region 903 (i.e., the depression shown in FIG. 1) will occupy a considerable wide area As a result, the size of the source electrode 807 needs to be considerably wider and the aperture ratio will lower conspicuously.

SUMMARY OF THE INVENTION

The present invention was created through consideration about the above-described problems.

Accordingly, an object of the present invention is to provide a substrate for a LCD device that improves the flatness of the outermost substrate surface in the contact region for interconnecting an electrode of a switching element (e.g., a TFT) and a pixel electrode to each other in each pixel, a method of fabricating the substrate, and a LCD device using the substrate.

Another object of the present invention is to provide a substrate for a LCD device that reduces the area of the contact region for interconnecting an electrode of a switching element and a pixel electrode to each other in each pixel, a method of fabricating the substrate, and a LCD device using the substrate.

Still another object of the present invention is to provide a substrate for a LCD device that effectively suppresses the contrast lowering and the aperture ratio reduction with a simple structure or method, a method of fabricating the substrate, and a LCD device using the substrate.

The above objects together with others not specifically mentioned will become clear to those skilled in the art from the following description.

According to a first aspect of the present invention, a substrate for a LCD device is provided, which comprises:

a transparent plate;

switching elements for respective pixels, formed on the plate;

protrusions for the respective pixels, formed on the plate in such a way as to protrude to a vicinity of an outermost surface of the substrate;

each of the protrusions raising an electrode of a corresponding one of the switching elements to the vicinity of the outermost surface in a corresponding one of the pixels;

a planarization layer formed in such a way as to cover the switching elements, the protrusions, and the electrodes of the elements in all the pixels, a surface of the planarization layer forming the outermost surface;

pixel electrodes for the respective pixels, formed on the outermost surface; and each of the pixel electrodes being contacted with a corresponding one of the electrodes of the switching elements in the vicinity of the outermost surface.

With the substrate according to the first aspect of the present invention, the protrusions for the respective pixels are formed on the transparent plate in such a way as to protrude to the vicinity of the outermost surface of the substrate. Each of the protrusions raises the electrode of a corresponding one of the switching elements to the vicinity of the outermost surface in a corresponding one of the pixels. The outermost surface is formed by the surface of the planarization layer that is formed in such a way as to cover the switching elements, the protrusions, and the electrodes of the elements in all the pixels. Each of the pixel electrodes formed on the outermost surface is contacted with a corresponding one of the electrodes of the switching elements in the vicinity of the outermost surface.

Therefore, a deep contact hole is unnecessary in a contact region for interconnecting one of the electrodes of the switching elements with a corresponding one of the pixel electrodes. As a result, the flatness of the outermost surface of the substrate is improved in the contact region. This leads to suppression of contrast lowering of the LCD device.

Moreover, since no deep contact hole is necessary and the flatness of the outermost surface of the substrate is improved in the above-described contact regions, leakage of light will not occur in the contact regions. This means that the area expansion of the electrode of each switching element is unnecessary. Thus, the area of each contact region can be reduced, which suppresses the reduction of the aperture ratio.

In this way, with the substrate according to the first aspect of the invention, the contrast lowering and the aperture ratio reduction are suppressed with a simple structure.

In a preferred embodiment of the substrate according to the first aspect, the switching elements are TFTs, and the electrodes of the switching elements are source electrodes or drain electrodes of the TFTs.

In another preferred embodiment of the substrate according to the first aspect, each of the electrodes of the switching elements is extended along top and side faces of a corresponding one of the protrusions.

In still another preferred embodiment of the substrate according to the first aspect, each of the electrodes of the switching elements is extended along top and side faces of a corresponding one of the protrusions, and is contacted with a corresponding one of the pixel electrodes at a top of a corresponding one of the protrusions.

In a further preferred embodiment of the substrate according to the first aspect, the planarization layer includes a transparent organic interlayer dielectric sublayer.

In a still further preferred embodiment of the substrate according to the first aspect, a color filter is additionally provided. A distance between a top of each of the protrusions and the outermost surface is shorter than a distance between a top of the color filter and the outermost surface.

In a still further preferred embodiment of the substrate according to the first aspect, a color filter is additionally provided. A boundary between the filter and each of the protrusions is superposed on a boundary between the planarization layer and the said protrusion.

According to a second aspect of the present invention, a method of fabricating a substrate for a LCD device is provided, which comprises the steps of:

forming protrusions for respective pixels on a transparent plate in such a way as to protrude to a vicinity of an outermost surface of the substrate;

forming switching elements for the respective pixels in such a way that electrodes of the elements are raised by the corresponding protrusions to the vicinity of the outermost surface;

forming a planarization layer in such a way as to cover the switching elements, the protrusions, and the electrodes of the elements in all the pixels, a surface of the planarization layer forming the outermost surface; and forming pixel electrodes for the respective pixels on the outermost surface;

wherein each of the pixel electrodes is contacted with a corresponding one of the electrodes of the switching elements in the vicinity of the outermost surface.

With the method according to the second aspect of the present invention, the protrusions for the respective pixels are formed on the transparent plate in such a way as to protrude to the vicinity of the outermost surface of the substrate and thereafter, the switching elements are formed in such a way that the electrodes of the elements are raised by the corresponding protrusions to the vicinity of the outermost surface. Following this, the planarization layer is formed in such a way as to cover the switching elements, the protrusions, and the electrodes of the elements in all the pixels. Subsequently, the pixel electrodes are formed on the outermost surface, where each of the pixel electrodes is contacted with the corresponding one of the electrodes of the switching elements in the vicinity of the outermost surface.

Accordingly, a deep contact hole is unnecessary in a contact region for interconnecting one of the electrodes of the switching elements with a corresponding one of the pixel electrodes. As a result, the flatness of the outermost surface of the substrate is improved in the contact regions. This leads to suppression of contrast lowering of the LCD device.

Moreover, since no deep contact hole is necessary and the flatness of the outermost surface of the substrate is improved in the above-described contact regions, leakage of light will not occur in the contact regions. This means that the area expansion of the electrode of each switching element is unnecessary. Thus, the area of each contact region can be reduced, which suppresses the reduction of the aperture ratio.

In this way, with the method according to the second aspect of the invention, the contrast lowering and the aperture ratio reduction are suppressed with a simple structure.

In a preferred embodiment of the method according to the second aspect, the switching elements are TFTs, and the electrodes of the switching elements are source electrodes or drain electrodes of the TFTs.

In another preferred embodiment of the method according to the second aspect, each of the electrodes of the switching elements is formed to extend along top and side faces of a corresponding one of the protrusions.

In still another preferred embodiment of the method according to the second aspect, each of the electrodes of the switching elements is formed to extend along top and side faces of a corresponding one of the protrusions and to contact a corresponding one of the pixel electrodes at a top of a corresponding one of the protrusions.

In a further preferred embodiment of the method according to the second aspect, the planarization layer includes a transparent organic interlayer dielectric sublayer.

In a still further preferred embodiment of the method according to the second aspect, a step of forming a color filter is additionally provided. A distance between a top of each of the protrusions and the outermost surface is shorter than a distance between a top of the color filter and the outermost surface.

In a still further preferred embodiment of the method according to the second aspect, a step of forming a color filter is additionally provided. A boundary between the filter and each of the protrusions is superposed on a boundary between the planarization layer and the said protrusion.

According to a third aspect of the present invention, a LCD device is provided, which comprises:

a first substrate;

a second substrate coupled with the first substrate to be opposite to each other at a gap; and a liquid-crystal layer formed in the gap.

The first substrate comprises:

a transparent plate;

switching elements for respective pixels, formed on the plate;

protrusions for the respective pixels, formed on the plate in such a way as to protrude to a vicinity of an outermost surface of the substrate;

each of the protrusions raising an electrode of a corresponding one of the switching elements to the vicinity of the outermost surface in a corresponding one of the pixels;

a planarization layer formed in such a way as to cover the switching elements, the protrusions, and the electrodes of the elements in all the pixels, a surface of the planarization layer forming the outermost surface;

pixel electrodes for the respective pixels, formed on the outermost surface; and each of the pixel electrodes being contacted with a corresponding one of the electrodes of the switching elements in the vicinity of the outermost surface.

With the device according to the third aspect of the present invention, the first substrate has the same structure as the substrate according to the first aspect and therefore, the same advantages as those of the substrate according to the first aspect are obtainable.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
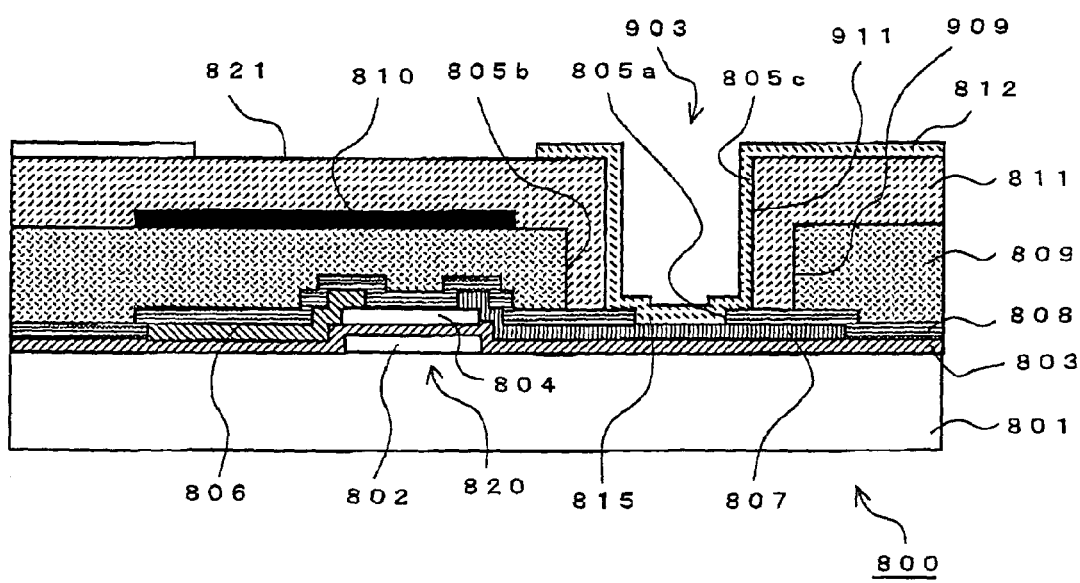
FIG. 1 is a schematic, partial cross-sectional view showing an example of the pixel structure of a prior-art CF-on-TFT array substrate.
Figure 2:
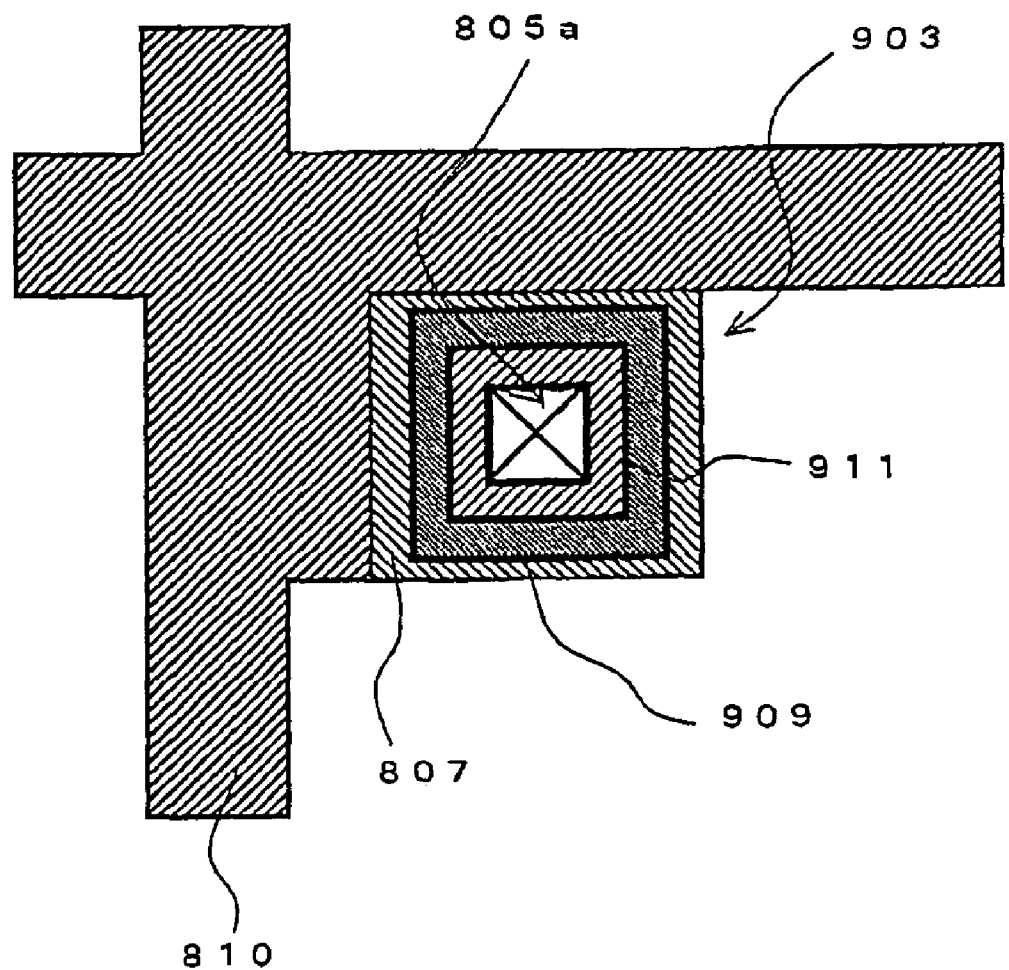
FIG. 2 is a plan view showing the layout in the contact region of the prior-art substrate of FIG. 1.

Preferred embodiments of the present invention will be described in detail below while referring to the drawings attached.

First Embodiment

Figure 3:
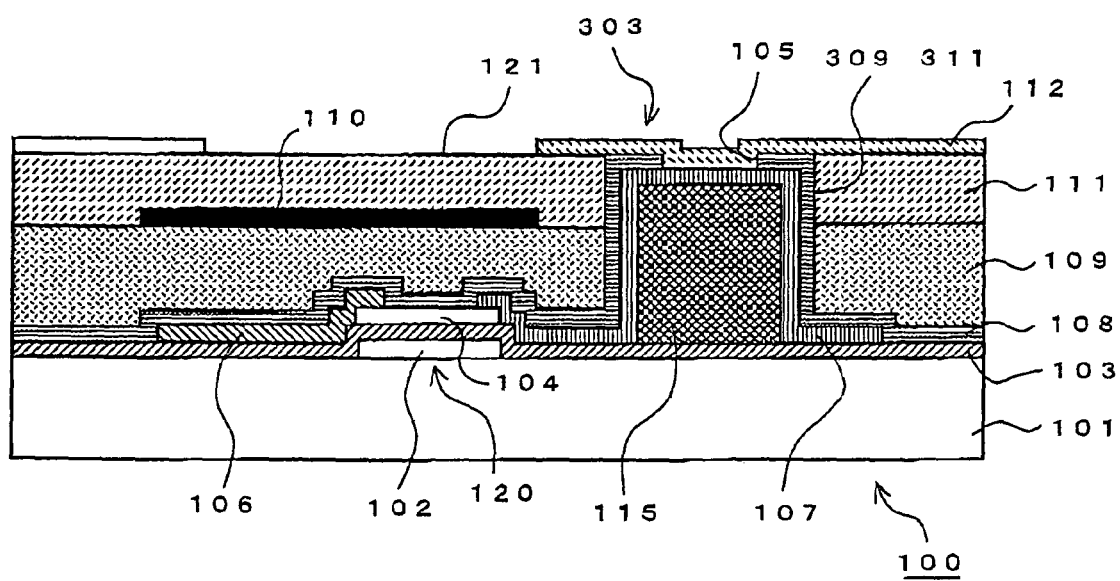
FIG. 3 is a schematic, partial cross-sectional view along the line III—III in FIG. 5, showing the pixel structure of a CF-on-TFT array substrate according to a first embodiment of the invention.
Figure 5:
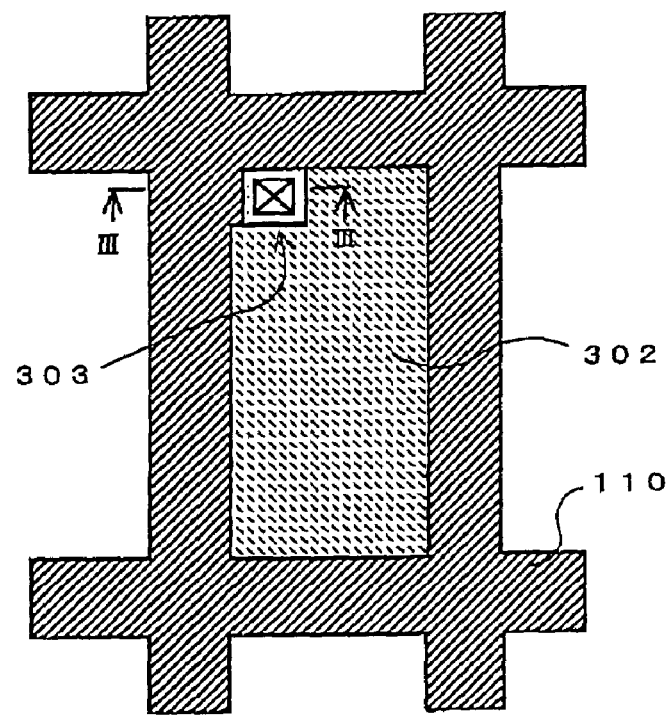
FIG. 5 is a schematic plan view showing the layout in the pixel formed on the substrate according to the first embodiment of FIG. 3.

A substrate 100 for a LCD device according to a first embodiment of the invention has the structure shown in FIGS. 3 and 5.

The substrate 100 according to the first embodiment, which is a CF-on-TFT array substrate on which a color filter is mounted, comprises gate electrodes and data electrodes (both not shown) arranged in a matrix array, and TFTs arranged at the respective intersections of the gate and data electrodes. Although a plurality of pixels is actually arranged on the substrate 100, one pixel will be explained here for the sake of simplification of description because all the pixels have the same structure.

With the CF-on-TFT array substrate 100, as shown in FIG. 3, a gate electrode 102 is formed on a transparent plate 101. The gate electrode 102 is covered with an inorganic gate dielectric layer 103 formed on the plate 101. On the gate dielectric layer 103, a patterned a-Si layer 104 is formed in such a way as to overlap with the gate electrode 102. On the gate dielectric layer 103, a protrusion 115 with a specific shape is formed at a location overlapping with a pixel electrode 112. This protrusion 115 is to raise the approximately middle part (i.e., the contacting part with the pixel electrode 112) of a source electrode 107 to a vicinity of the outermost surface 121 of the substrate 100. The protrusion 115 does not overlap with the a-Si layer 104.

The protrusion 115 is formed in such a way that the top face of the protrusion 115 is located near the outermost surface 121. In other words, the protrusion 115 reaches the vicinity of the surface 121. The shape of the horizontal cross-section of the protrusion 115 is rectangular. The plan shape of the source electrode 107 is rectangular as well. However, the horizontal cross-section of the protrusion 115 is narrower than the plan shape of the source electrode 107. Thus, the whole protrusion 115 is covered with the source electrode 107. The protrusion 115 is formed by patterning a layer of an organic resist material.

A drain electrode 106 and a source electrode 107 are formed at the opposite ends of the a-Si layer 104, respectively. The source electrode 107 is overlapped with the protrusion 115 As described previously, the approximately middle part of the source electrode 107 is raised by the protrusion 115 to the vicinity of the outermost surface 121. The source electrode 107 is formed to extend along the whole top face and the whole side face of the protrusion 115. In other words, the source electrode 107 is contacted with the whole top face and the whole side face of the protrusion 115 and covers the same. Therefore, the protrusion 115 is entirely covered with the source electrode 107 and is unable to be seen from the side of the outermost surface 121.

The gate electrode 102, the gate dielectric layer 103, the a-Si layer 104, and the drain and source electrodes 106 and 107 constitute a TFT 120. The gate dielectric layer 103, which is formed to cover the whole plate 101, is commonly used by all the TFTs 120 arranged on the plate 101.

The TFT 120 is covered with an inorganic interlayer dielectric layer (which serves as a passivation layer) 108. Typically, the layer 108 is several hundreds nanometers (nm) in thickness. The layer 108 has a contact hole 105 formed over the top of the protrusion 115. The hole 105, which is rectangular in horizontal cross section, exposes partially the underlying source electrode 107. Since the size of the hole 105 is smaller than the area of the top of the protrusion 115, only a part of the source electrode 107 is exposed on the top of the protrusion 115.

On the interlayer dielectric layer 108, a patterned color filter (i.e., a color layer) 109 is formed. The thickness of the filter 109 is determined in such a way that the surface of the filter 109 is lower than the top of the protrusion 115. Thus, the top of the protrusion 115 protrudes upward from the filter 109, in other words, the top of the protrusion 115 is not covered with the filter 109.

On the color filter 109, a patterned light-shielding layer 110 is selectively formed at a location that overlaps with the TFT 120. The layer 110 has a function of preventing the external light from irradiating to the a-Si layer 104 and the drain electrode 106 of the TFT 120.

Moreover, an organic transparent interlayer dielectric layer 111 is formed on the color filter 109 to cover the light-shielding layer 110. Typically, the layer 111 has a thickness of 2 to 3 µm. The thickness of the layer 111 is determined in such that the surface of the layer 111 is in the same level as the top of the interlayer dielectric layer 108 on the top of the protrusion 115. Thus, no contact hole is formed in the interlayer dielectric layer 111 and at the same time, the contact hole 105 of the layer 108 is exposed from the layer 111 on the top of the protrusion 105. Because of this, the part of the underlying source electrode 107 is exposed from the layer 111 through the hole 105. Since the hole 105 is formed to penetrate through the thin interlayer dielectric layer 108, the hole 105 is very shallow.

On the surface of the interlayer dielectric layer 111, in other words, on the outermost surface 121 of the TFT array substrate 100, a pixel electrode 112 is formed. The pixel electrode 112 is contacted with the source electrode 107 on the top of the protrusion 115 by way of the contact hole 105 of the interlayer dielectric layer 108. In this way, the pixel electrode 112 and the source electrode 107 are electrically connected to each other.

FIG. 5 shows a plan view showing the layout in the contact region 303 (i.e., in the neighborhood of the contact hole 105) of the CF-on-TFT substrate 100 according to the first embodiment of FIG. 3. As shown in FIG. 5, the light-shielding layer 110, which is patterned to be lattice-shaped in its plan view, has an approximately rectangular transmission region 302 corresponding to each pixel. The transmission region 302 and a corresponding contact region 303 thereto are formed for each pixel.

Figure 6:
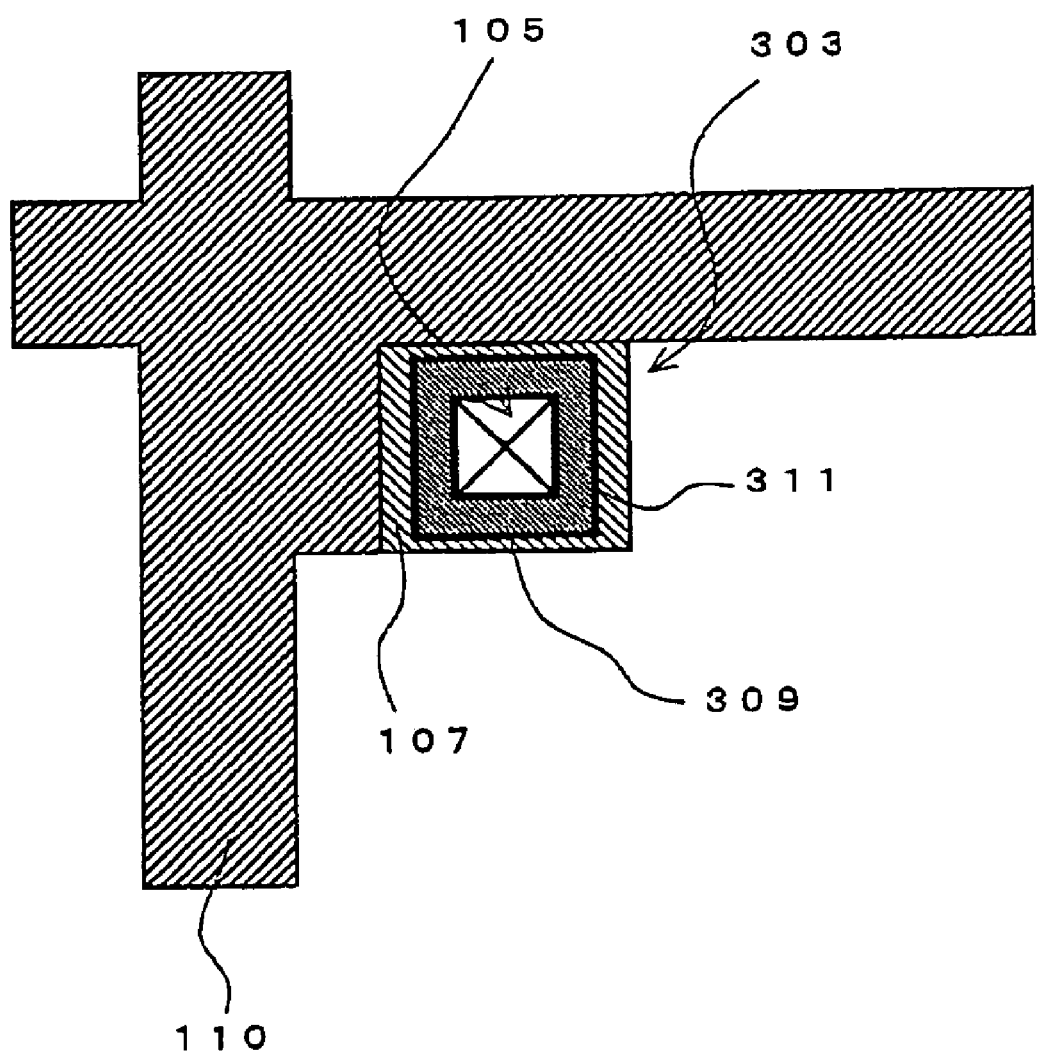
FIG. 6 is a plan view showing the layout in the contact region of the substrate according to the first embodiment of FIG. 3

FIG. 6 shows an enlarged plan view showing the layout near the contact region 303 of the substrate 100 according to the first embodiment. As shown in FIG. 6, in the contact region 303 for interconnecting the source electrode 107 and the pixel electrode 112, the boundary 309 of the color filter 109 on the side of the protrusion 115 and the boundary 311 of the organic interlayer dielectric layer 111 on the side of the protrusion 115 are contacted with the vertically-extending part of inorganic interlayer dielectric layer 108. Thus, these two boundaries 309 and 311 are superposed to each other, in other words, the boundaries 309 and 311 are vertically aligned, when observed from the side of the outermost surface 121. Therefore, the area of the contact region 303 in the first embodiment of the invention can be reduced, thereby improving the aperture ratio and luminance of the LCD panel. This is unlike the prior-art substrate 800 shown in FIG. 1 where the contact region 903 needs to be considerably wide due to the multiple contact-hole structure of the holes 805a, 805b, and 805c.

With the CF-on-TFT array substrate 100 according to the first embodiment of the invention, as explained above, the protrusions 115 for the respective pixels are formed on the transparent plate 101 in such a way as to protrude to the vicinity of the outermost surface 121 of the substrate 100. Each of the protrusions 115 raises the source electrode 107 of a corresponding one of the TFTs 120 (i.e., the switching elements) to the vicinity of the surface 121 in a corresponding one of the pixels. The outermost surface 121 is formed by the surface of the transparent organic interlayer dielectric layer (i.e., the surface of the planarization layer) 111 that is formed in such a way as to cover the TFTs 120, the protrusions 115, and the source electrodes 107 in all the pixels. Each of the pixel electrodes 112 formed on the outermost surface 121 is contacted with a corresponding one of the source electrodes 107 in the vicinity of the surface 121 by way of the contact hole 105.

Therefore, no deep contact hole is necessary in the contact region 303 for interconnecting one of the source electrodes 107 with a corresponding one of the pixel electrodes 112. As a result, the flatness of the outermost surface 121 is vastly improved in the contact region 303, thereby making the whole surface 121 approximately flat. This eliminates the disturbance of the orientation of the liquid crystal molecules used, which suppresses the contrast lowering of the LCD device.

Moreover, since no deep contact hole is necessary and the flatness of the outermost surface 121 is vastly improved in the contact region 303, leakage of light will not occur in the region 303. This means that the area expansion of the source electrode 107 is unnecessary. Thus, the area of the region 303 can be reduced, which suppresses the reduction of the aperture ratio of the LCD device.

In this way, with the substrate 100 according to the first embodiment, the contrast lowering and the aperture ratio reduction are suppressed with a simple structure and as a result, the quality of images is advanced.

Next, a method of fabricating the substrate 100 according to the first embodiment is explained below.

In summary, the gate electrodes 102 for the respective pixels are first formed on the transparent plate 101 and then, the inorganic gate dielectric layer 103 is formed thereon. Next, the patterned a-Si layers 104 are formed on the layer 103. The protrusions 115 are formed at the respective positions that will become the contact regions 303 for the pixels and then, the drain electrodes 106 and the source electrodes 107 are formed for the respective pixels. After the inorganic interlayer dielectric layer 108 is formed, the patterned color filter 109 is formed on the layer 108 by using colored resist materials. On the color filter 109, the patterned light-shielding layer 110 is formed by using a black resist material. After forming the transparent organic interlayer dielectric layer 111 to cover the light-shielding layer 110, the contact holes 105 for interconnecting the source electrodes 107 with the corresponding pixel electrodes 112 are formed to penetrate the layer 108. Finally, a transparent conductive layer is formed on the surface of the layer 111 (i.e., the outermost surface 121) and patterned, thereby forming the pixel electrodes 112.

The respective process steps of the fabrication method will be explained in detail below with reference to FIGS. 7A to 7C and FIGS. 8A to 8C.

Figure 7A:
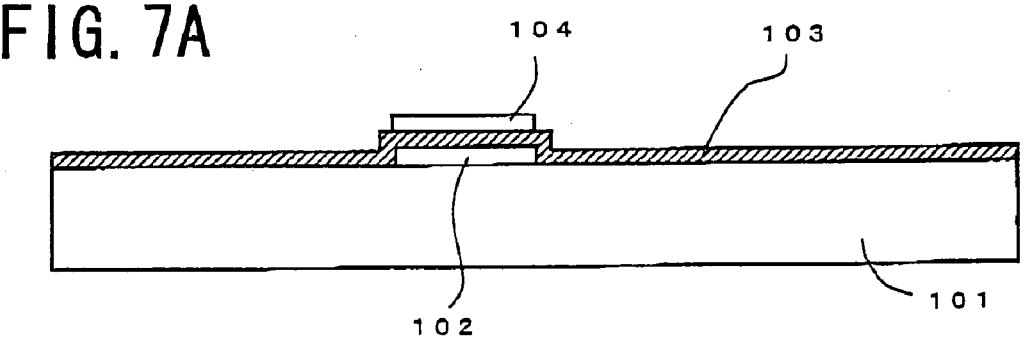
FIGS. 7A to 7C are partial schematic cross-sectional views of the substrate according to the first embodiment of FIG. 3, respectively, which show the process steps of its fabrication method.

First, as shown in FIG. 7A, on the surface of the transparent plate 101, the gate electrodes 102 are formed for the respective pixels. The plate 110 may be made of any rigid, transparent material if it is not denatured and deformed through the heating process or processes contained in the fabrication process sequence. For example, glass, quartz or plastic may be used. Glass is typically used for this purpose. The gate electrodes 102 are usually united with the gate lines. A layer of metal (e.g., Cr or Al) for the gate electrodes 102 (and gate lines) is formed on the plate 101 by sputtering or the like. The layer of metal is then patterned by photolithography and etching processes to have a specific shape, resulting in the gate electrodes 102 (and gate lines).

Subsequently, on the whole plate 101, the inorganic gate dielectric layer 103 is formed to cover the gate electrodes 102. The layer 103 is typically made of silicon dioxide ($SiO_2$). On the gate dielectric layer 103, the patterned a-Si layers 104 are formed to cover the respective gate electrodes 102 An a-Si layer is formed by a CVD (Chemical Vapor Deposition) process or the like and then, it is patterned by photolithography and etching processes, resulting in the a-Si layers 104. The state at this stage is shown in FIG. 7A.

Figure 7B:
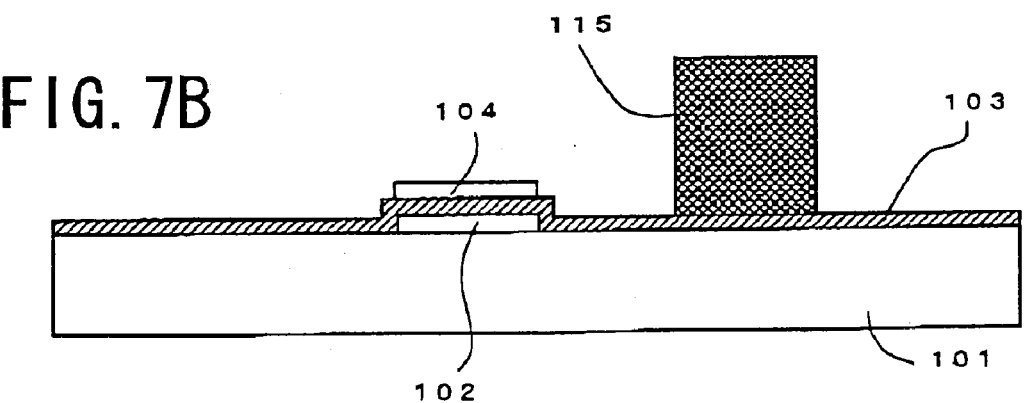

On the gate dielectric layer 103, the protrusions 115 are formed for the respective pixels, as shown in FIG. 7B. The height of each protrusion 115 is set to be approximately equal to the sum of the thicknesses of the inorganic interlayer dielectric layer 108, the color filter 109, and the organic interlayer dielectric layer 111. For example, the height of each protrusion 115 is set at approximately 2 to 3 $\mu$m. The material for the protrusions 115 is optionally chosen if it is able to form the protrusions 115 having such the height and shape and is able to keep the same. In the first embodiment, a photosensitive organic resist material is used for the protrusions 115. Actually, this photosensitive organic resist material is coated to form a layer with a desired thickness on the gate dielectric layer 103 and then, it is exposed to light with a mask having a desired pattern and developed. Thus, the protrusions 115 each having a specific three-dimensional shape are formed, as shown in FIG. 7B. At this time, to prevent the protrusions 115 from being vertically tapered (in other words, to prevent the protrusions 115 from being relatively thick at their tops and relatively thin at their bottoms), it is preferred that an intermediate bake process is additionally carried out for the layer of the organic resist material. In this case, thereafter, a main sintering process is conducted for the said layer. The intermediate bake process is preferably carried out at a temperature of 100 to 150° C. for approximately two to five minutes The main sintering process is preferably conducted at a temperature of 200 to 230° C. for approximately one hour.

Figure 7C:
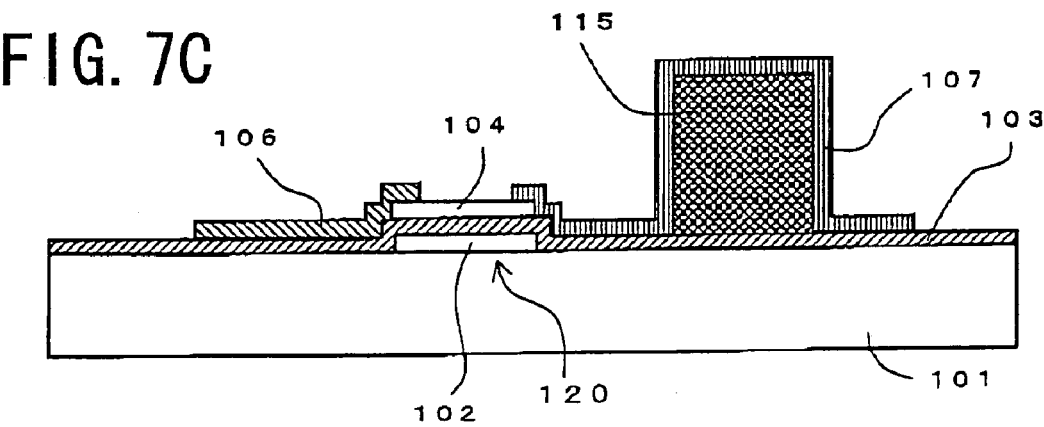

Following the process step of forming the protrusions 115, as shown in FIG. 7C, the drain and source electrodes 106 and 107 are formed on the gate dielectric layer 103 for the respective pixels. Similar to the prior-art substrate 800, each of the drain electrodes 106 is contacted with the corresponding a-Si layer 104 at its one end and the remainder thereof is placed on the layer 103. Unlike this, each of the source electrodes 107 is contacted with the corresponding a-Si layer 104 at its one end and the remainder thereof is formed to entirely cover the corresponding protrusion 115. The source electrode 107 covers the whole top face and the whole side face of the protrusion 115. The remainder of the source electrode 107 is placed on the layer 103. A layer of metal (e.g., Cr or Al) used for the drain and gate electrodes 106 and 107 is formed by sputtering or the like. The layer of metal is then patterned by photolithography and etching processes to have a specific shape, resulting in the electrodes 106 and 107. In the first embodiment, an organic resist material is used for making the protrusions 115 and therefore, the layer of metal needs to be formed at the highest usable temperature of the organic resist material (i.e., 230° C.) or lower. The state at this stage is shown in FIG. 7C.

Figure 8A:
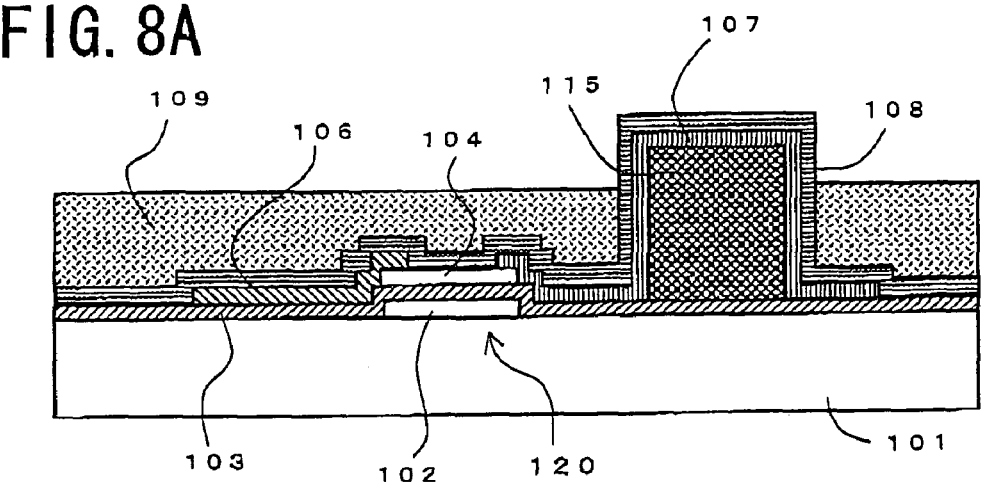
FIGS. 8A to 8C are partial schematic cross-sectional views of the substrate according to the first embodiment of FIG. 3, respectively, which show the process steps of its fabrication method subsequent to the step of FIG. 7C.

Subsequently, as shown in FIG. 8A, the inorganic interlayer dielectric layer 108 is formed to cover the drain and source electrodes 106 and 107 and the protrusions 115. Since the layer 108 is as thin as several hundreds nanometers (nm), the layer 108 extends along the uneven surface formed by the electrodes 106 and 107 and the protrusions 115. In other words, the surface of the layer 108 is uneven according to the reflection of the said uneven surface. The layer 108 covers the whole side face and the whole top face of each protrusion 115. As the layer 108, a silicon dioxide ($SiO_2$), silicon nitride ($SiN_x$) layer, or the like deposited by a sputtering or CVD process is used.

Thereafter, on the interlayer dielectric layer 108, the patterned color filter (i.e., the patterned color layer) 109 is formed. The thickness of the filter 109 is determined such that the surface of the filter 109 is lower than the tops of the protrusions 115 (in other words, the tops of the protrusions 115 protrude from the filter 109). As a material for the filter 109, a photosensitive organic resist that is denatured by exposure to light is preferably used. Typically, a negativetype photosensitive colored resist material, such as PVA (polyvinyl alcohol)-based resins, photosensitive acrylic resins, and photosensitive epoxy resin, is used for this purpose. Actually, this photosensitive organic resist material for red (R) color is coated to form a layer with a desired thickness on the interlayer dielectric layer 108 and then, it is exposed to light with a mask having a desired pattern and developed. These processes are repeated for green (G) and blue (B) colors. Thereafter, these patterned layers are subjected to the main sintering process. Thus, the patterned color filter 109 is formed, as shown in FIG. 8A. The condition of the said main sintering process is optionally determined. However, it is preferred that the sintering process is carried out at 200 to 230° C. for approximately one hour with a hot plate or the like.

Figure 8B:
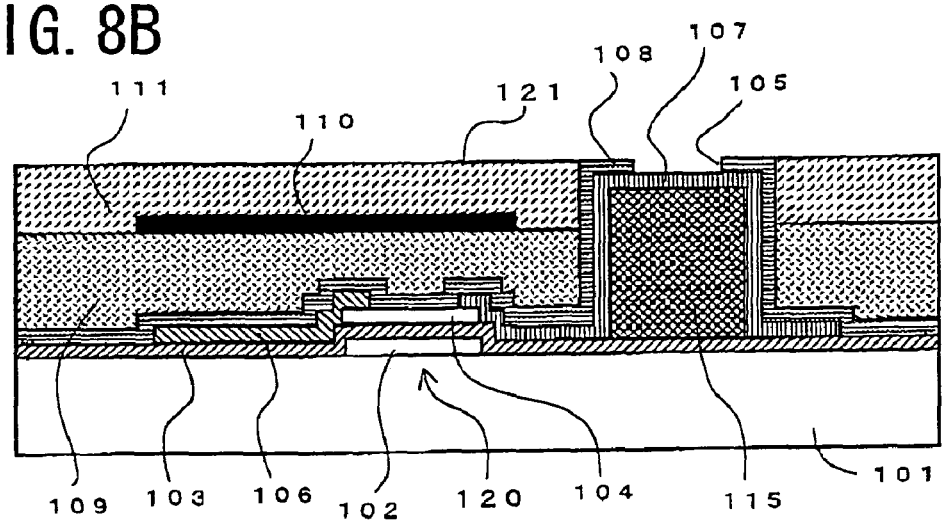

On the color filter 109 thus formed, the patterned light-shielding layer 110 is formed in such a way as to overlap with the respective TFTs 120, as shown in FIG. 8B. The layer 110 may be formed by depositing a layer of metal (e.g., Cr) on the filter 109 by sputtering or the like, and patterning the same through photolithography and etching processes. Alternately, the layer 110 may be formed by coating a photosensitive black resist material to form a layer, exposing and developing the layer thus formed with a mask having a desired pattern, and sintering the same.

Following this, the transparent organic interlayer dielectric layer 111 is formed on the color filter 109 to cover the light-shielding layer 110. The layer 111 is made of an organic material with high chemical resistance. Since the layer 111 is provided to prevent the color filter 109 (which is made of the photosensitive colored resist materials) from being denatured or degraded during the subsequent process steps, the layer 111 needs to be formed to cover the whole filter 109. The thickness of the layer 111 is typically 2 to 3 $\mu$m. In the first embodiment, the thickness of the layer 111 is determined such that the surface of the layer 111 is in the same level as the inorganic interlayer dielectric layer 108 on the respective tops of the protrusions 115. Therefore, no contact hole is formed to penetrate the layer 111. The contact holes 105 of the inorganic interlayer dielectric layer 108 and the parts of the source electrodes 107 are exposed from the layer 111 on the corresponding tops of the protrusions 115.

In the first embodiment, the interlayer dielectric layer 111 is made of a photosensitive resist material having a high chemical resistance. After this resist material is coated on the filter 109 to form a resist layer with a specific thickness, the resist layer is exposed to light with a mask having a desired pattern and developed, thereby forming the layer 111, as shown in FIG. 8B. If the resist layer includes some colored regions, preferably, it is subject to a bleaching process by exposing its entirety to light after the development process to thereby decolorize them and thereafter, it is subjected to a main sintering process.

Subsequently, the contact holes 105 are formed to penetrate the interlayer dielectric layer 108 partially exposed from the outermost surface 121 over the corresponding tops of the protrusions 115. This process is carried out by photolithography and etching processes. The state at this stage is shown in FIG. 8B.

Figure 8C:
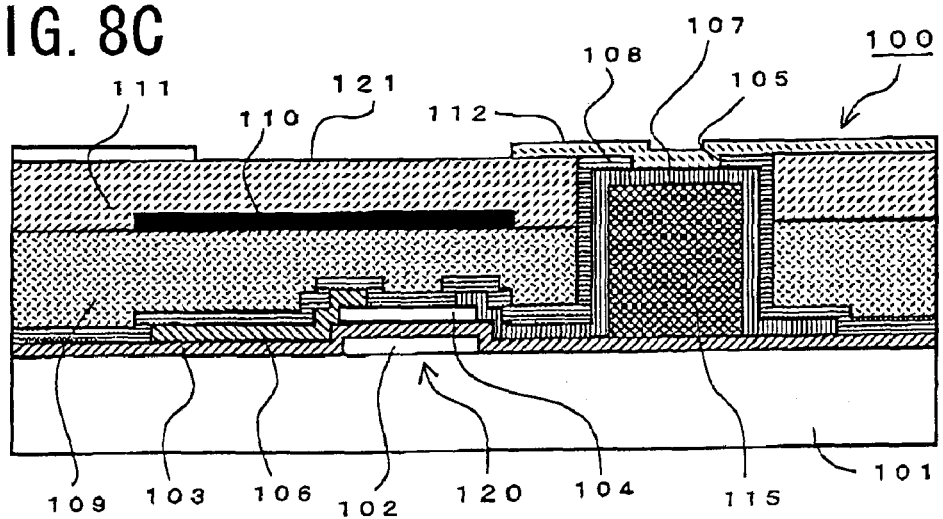

On the outermost surface 121 (i.e., on the surface of the interlayer dielectric layer 111), a transparent conductive layer (not shown) is formed by a sputtering process or the like. Then, the conductive layer thus formed is patterned by photolithography and etching processes, forming the pixel electrodes 112 on the surface 121, as shown in FIG. 8C. Since the contact holes 105 are formed in the interlayer dielectric layer 108, the pixel electrodes 112 are contacted with the corresponding source electrodes 107 by way of the corresponding holes 105. The state at this stage is shown in FIG. 8C. In this way, the CF-on-TFT array substrate 100 according to the first embodiment having the structure of FIG. 3 is obtained.

In each of the above-described process steps, it is popular that a cleaning process of the plate is carried out before the layer formation process and the resist coating in the photolithography process. For the cleaning process, brushing cleaning, ultrasonic cleaning, chemical cleaning using isopropanol or the like, or pure water cleaning may be used. A drying process after cleaning is usually carried out using an IR (infrared) heater, a hot plate, or the like, at approximately 120 to 180° C. for approximately two to five minutes.

A method of coating the resist material is optionally selectable. For example, spin coating, slit coating, or the like is used. A drying process under reduced pressure, which is conducted immediately after the resist coating process, is to vaporize the solvent contained in the resist material and to relax the thermal distribution of the resist layer in the subsequent preliminary sintering process. The vacuum pressure to be achieved and the drying period therefor are optionally determined according to the amount of the resist material coated and the percentage of the solvent contained therein. The preliminary sintering process is a process of removing the solvent remaining in the resist layer through vaporization after the drying process under reduced pressure. The preliminary sintering process is usually carried out using a hot plate, an oven, or the like, at approximately 70 to 100° C. for approximately two to four minutes.

After the preliminary sintering process is completed, the plate on which the resist layer has been formed is selectively exposed to light in the exposure process. The method of exposure is optionally selectable. Any method of exposure may be used if it denatures the resist layer. For example, a projection method with a mask or a direct writing method using laser may be preferably used. As the exposing light, any light may be used if it has a wavelength within the sensitivity range of the resist layer. For example, ultraviolet rays, the g, h, or i line of a mercury lamp, light of a xenon lamp, light of an excimer laser, X rays, an electron beam, $\gamma$ rays, or an ion beam may be used.

The development process after the exposure process is conducted by a method corresponding to the resist material used. As the development fluid, an organic alkali solution or an inorganic alkali solution is usually used.

The etching process may be carried out by any method. Usually, a dry etching method using gas reaction or plasma or a wet etching method using an acid solution is used.

In the formation process of the organic layer, an organic layer is patterned to have a desired shape by the development process and thereafter, a main sintering process is carried out for the organic layer, thereby completing the formation of the patterned organic layer as desired. The main sintering process for the organic layer is conducted with a hot plate, an oven, or the like, at a constant temperature of approximately 0.200 to 230° C. for approximately one hour. Following this, a heating process is conducted to prevent problems such as the generation of volatile materials contained.

As explained above in detail, with the above-described fabrication method, the CF-on-TFT array substrate 100 having the structure of FIG. 3 is easily obtained.

Figure 4:
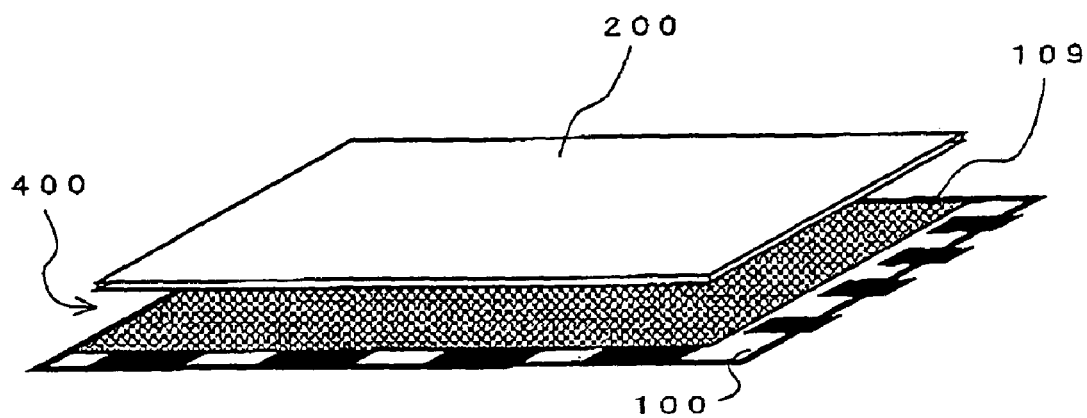
FIG. 4 is a schematic perspective view showing the rough structure of a LCD device using the array substrate according to the first embodiment of FIG. 3.

FIG. 4 schematically shows the structure of a LCD device according to the first embodiment. This LCD device comprises the TFT array substrate 100 shown in FIG. 3, an opposite substrate 200 coupled with the substrate 100 at a specific gap, and a liquid-crystal layer 400 including a liquid crystal (not shown) confined in the gap. On the substrate 200, an opposite electrode or electrodes (not shown) is/are formed.

The structure of the opposite substrate 200 and the method of fabricating the same, and the overall structure of the LCD device and the method of assembling the same are well known to the ordinary skill in the art. Therefore, the explanation about them is omitted here for simplicity.

With the LCD device according to the first embodiment of FIG. 4, the TFT array substrate 100 of FIG. 3 is used and thus, the same advantages as those in the substrate 100 are obtainable.

Second Embodiment

Next, a substrate 100A for a LCD device according to a second embodiment of the invention is explained. While the invention is applied to a CF-on-TFT substrate in the first embodiment, it is applied to an ordinary TFT substrate on which no color filter is provided in the second embodiment.

Figure 9A:
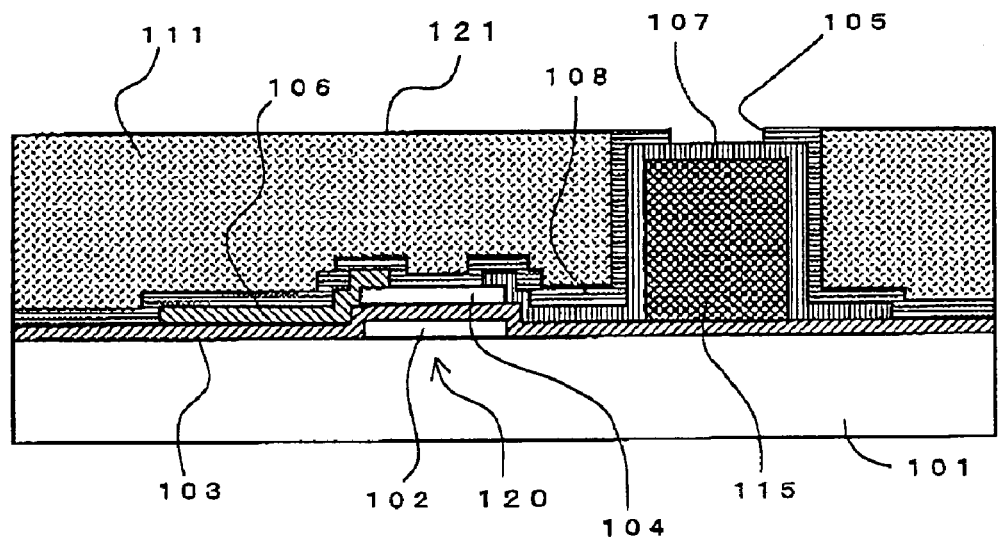
FIGS. 9A and 9B are partial schematic cross-sectional views of a TFT array substrate according to a second embodiment of FIG. 3, respectively, which show the process steps of its fabrication method.
Figure 9B:
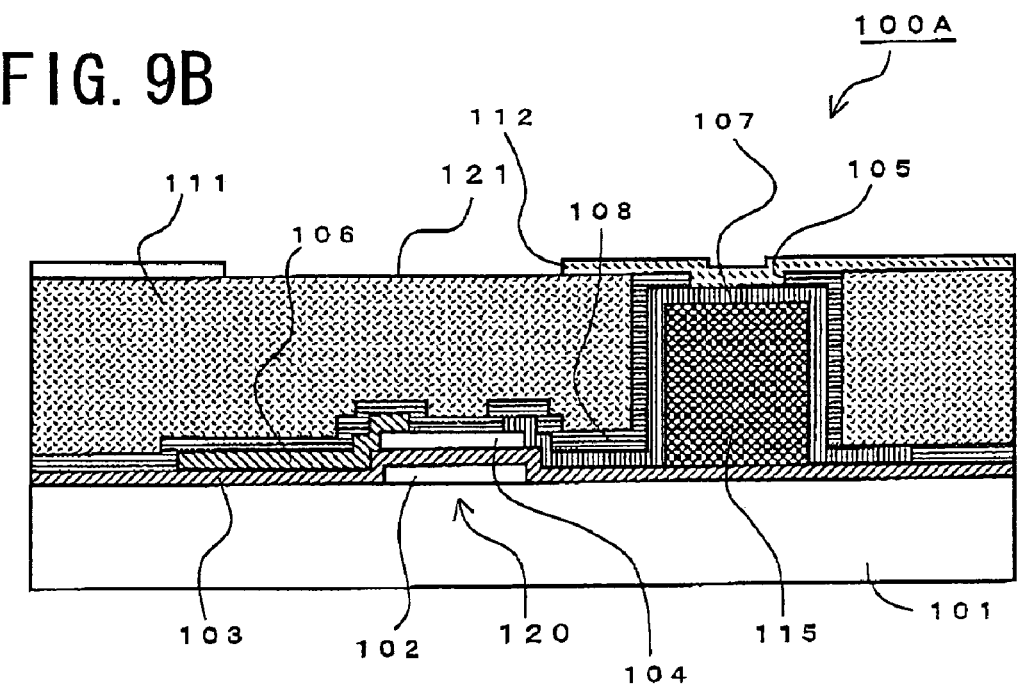

The structure of the substrate 100A of the second embodiment is shown in FIG. 9B. As seen from FIG. 9B, the substrate 100A has the same structure as the substrate 100 of the first embodiment except that the color filter 109 and the light-shielding layer 110 are not formed. Therefore, the explanation about the structure is omitted here for the sake of simplification by attaching the same reference symbols as those used in the first embodiment to the corresponding elements on FIG. 9B.

With the substrate 100A of the second embodiment, the transparent organic interlayer dielectric layer 111 is formed directly on the inorganic interlayer dielectric layer 108. The thickness of the layer 111 is determined in such a way that the surface of the layer 111 (i.e., the outermost surface 121) is in the same level as the layer 108 on the respective tops of the protrusions 115. Here, the thickness of the layer 111 is set at approximately 1 to 2 μm. The height of the protrusions 115 is set to be approximately equal to the thickness of the layer 111.

Accordingly, similar to the first embodiment, no deep contact hole is necessary in the contact region 303 for interconnecting one of the source electrodes 107 with a corresponding one of the pixel electrodes 112. As a result, the flatness of the outermost surface 121 of the substrate 100A is vastly improved in the contact region 303, thereby making the whole surface 121 approximately flat. Thus, the same advantages as those in the first embodiment are obtainable.

A method of fabricating the substrate 100A of the second embodiment is the same as the method of fabricating the substrate 100 of the first embodiment, except that the processes of forming the color filter 109 and the light-shielding layer 110 are unnecessary.

Specifically, after the inorganic interlayer dielectric layer 108 is formed in the same way as the first embodiment, the transparent organic interlayer dielectric layer 111 is formed on the layer 108, as shown in FIG. 9A. Since the thickness of the layer 111 is determined such that the surface of the layer 111 is in the same level as the layer 108 on the respective protrusions 115, the layer 111 does not have any contact hole. The layer 108 is partially exposed from the layer 111 on the tops of the protrusions 115 at this stage.

Subsequently, the contact holes 105, which are used for electrically connecting the pixel electrodes 112 to the corresponding source electrodes 107, are formed to penetrate the layer 108 exposed from the layer 111 on the respective protrusions 115. The state at this stage is shown in FIG. 9B.

Finally, on the surface of the interlayer dielectric layer 111 (i.e., on the outermost surface 121), the pixel electrodes 121 are formed, as shown in FIG. 9B. In this way, the TFT array substrate 100A of the second embodiment is obtained.

Other Embodiments

It is needless to say that the present invention is not limited to the above-described first and second embodiments. Any modification is applicable to these embodiments. For example, although a TFT is used as the switching element in the above-described embodiments, any other switching element such as a field-effect transistor (MOSFET) using a single-crystal substrate may be used. As the semiconductor layer for the TFTs, any other semiconductor material such as polysilicon may be used instead of a-Si layer.

Moreover, in the above-described embodiments, the source electrode 107 covers the whole side face and the whole top face of the corresponding protrusion 115. However, the invention is not limited to this. It is sufficient for the invention that the source electrode 107 contacts the corresponding pixel electrode 112 in the vicinity of the outermost surface 121 (i.e., in the position vertically away from the plate 101). It is not always necessary for the electrode 107 to cover the whole side face and the whole top face of the corresponding protrusion 115.

Not to mention, the shape and height of the protrusion 115 are optionally adjustable The material of the protrusion 115 is optionally selectable if it forms and keeps the shape of the protrusion 115.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A substrate for a LCD device comprising:
   a transparent plate;
   switching elements for respective pixels, formed on the plate;
   protrusions for the respective pixels, formed on the plate in such a way as to protrude to a vicinity of an outermost surface of the substrate;
   each of the protrusions raising an electrode of a corresponding one of the switching elements to the vicinity of the outermost surface in a corresponding one of the pixels;
   a planarization layer formed in such a way as to cover the switching elements, the protrusions, and the electrodes of the elements in all the pixels, a surface of the planarization layer forming the outermost surface, the planarization layer having at least one contact hole formed over each corresponding protrusion, partially exposing the electrodes;
   pixel electrodes for the respective pixels, formed on the outermost surface; and
   each of the pixel electrodes being contacted with a corresponding one of the electrodes of the switching elements in the vicinity of the outermost surface.

2. The substrate according to claim 1, wherein the switching elements are TFTs, and the electrodes of the switching elements are source electrodes or drain electrodes of the TFTs.

3. The substrate according to claim 1, wherein each of the electrodes of the switching elements is extended along top and side faces of a corresponding one of the protrusions.

4. The substrate according to claim 1, wherein each of the electrodes of the switching elements is extended along top and side faces of a corresponding one of the protrusions, and is contacted with a corresponding one of the pixel electrodes at a top of a corresponding one of the protrusions.

5. The substrate according to claim 1, wherein the planarization layer includes a transparent organic interlayer dielectric sublayer.

6. The substrate according to claim 1, further comprising a color filter; wherein a distance between a top of each of the protrusions and the outermost surface is shorter than a distance between a top of the color filter and the outermost surface.

7. The substrate according to claim 1, further comprising a color filter; wherein a boundary of the filter on a side of each of the protrusions is superposed on a boundary of the planarization layer on a side of each of the protrusions.

8. A method of fabricating a substrate for a LCD device, comprising the steps of:
forming protrusions for respective pixels on a transparent plate in such a way as to protrude to a vicinity of an outermost surface of the substrate;
forming switching elements for the respective pixels in such a way that electrodes of the elements are raised by the corresponding protrusions to the vicinity of the outermost surface;
forming a planarization layer in such a way as to cover the switching elements, the protrusions, and the electrodes of the elements in all the pixels, a surface of the planarization layer forming the outermost surface;
forming at least one contact hole on the planarization layer and over each corresponding protrusion, partially exposing the electrodes; and
forming pixel electrodes for the respective pixels on the outermost surface;
wherein each of the pixel electrodes is contacted with a corresponding one of the electrodes of the switching elements in the vicinity of the outermost surface.

9. The method according to claim 8, wherein the switching elements are TFTs, and the electrodes of the switching elements are source electrodes or drain electrodes of the TFTs.

10. The method according to claim 8, wherein each of the electrodes of the switching elements is formed to extend along top and side faces of a corresponding one of the protrusions.

11. The method according to claim 8, wherein each of the electrodes of the switching elements is formed to extend along top and side faces of a corresponding one of the protrusions and to contact a corresponding one of the pixel electrodes at a top of a corresponding one of the protrusions.

12. The method according to claim 8, wherein the planarization layer includes a transparent organic interlayer dielectric sublayer.

13. The method according to claim 8, further comprising a step of forming a color filter; wherein a distance between a top of each of the protrusions and the outermost surface is shorter than a distance between a top of the color filter and the outermost surface.

14. The method according to claim 8, further comprising a step of forming a color filter; wherein a boundary of the filter on a side of each of the protrusions is superposed on a boundary of the planarization layer on a side of each of the protrusions.

15. A LCD device comprising:
a first substrate;
a second substrate coupled with the first substrate to be opposite to each other at a gap; and
a liquid-crystal layer formed in the gap;
wherein the first substrate comprises:
a transparent plate;
switching elements for respective pixels, formed on the plate;
protrusions for the respective pixels, formed on the plate in such a way as to protrude to a vicinity of an outermost surface of the substrate;
each of the protrusions raising an electrode of a corresponding one of the switching elements to the vicinity of the outermost surface in a corresponding one of the pixels;
a planarization layer formed in such a way as to cover the switching elements, the protrusions, and the electrodes of the elements in all the pixels, a surface of the planarization layer forming the outermost surface, the planarization layer having at least one contact holes formed over each corresponding protrusion, partially exposing the electrodes;
pixel electrodes for the respective pixels, formed on the outermost surface; and
each of the pixel electrodes being contacted with a corresponding one of the electrodes of the switching elements in the vicinity of the outermost surface.

16. The substrate according to claim 1, further comprising an interlayer dielectric layer covering the switching elements and the protrusions, the interlayer dielectric layer being located between the switching elements and protrusions, and the planarization layer, the surface of the planarization layer is in a same level as a surface of the interlayer dielectric layer on the protrusions.

17. The substrate according to claim 16, wherein the at least one contact hole is formed to penetrate is formed to penetrate the interlayer dielectric layer over each corresponding protrusion.

18. The method according to claim 8, further comprising the step of forming an interlayer dielectric layer covering the switching elements and the protrusions, the interlayer dielectric layer being located between the switching elements and protrusions, and the planarization layer, the surface of the planarization layer is in a same level as a surface of the interlayer dielectric layer on the protrusions.

19. The method according to claim 18, wherein the at least one contact hole is formed to penetrate is formed to penetrate the interlayer dielectric layer over each corresponding protrusion.

* * * * *